United States Patent [19]
Danek

[11] Patent Number: 5,460,355
[45] Date of Patent: Oct. 24, 1995

[54] ADJUSTABLE SHOCK ABSORBER

[75] Inventor: Magnus Danek, Upplands Vasby, Sweden

[73] Assignee: Yamaha Motor Co., Ltd., Iwata, Japan

[21] Appl. No.: 163,071

[22] Filed: Dec. 6, 1993

[30] Foreign Application Priority Data

Dec. 9, 1992 [SE] Sweden ............................ 9203706

[51] Int. Cl.⁶ ............................................. B60G 13/00
[52] U.S. Cl. ............................................. 267/221; 267/218
[58] Field of Search ............................ 267/195, 217, 267/221, 34, 218, 64.28; 188/315, 299, 322.14, 313, 318, 322.19, 280

[56] References Cited

U.S. PATENT DOCUMENTS

| | | | |
|---|---|---|---|
| 2,780,321 | 2/1957 | Sturari | 188/319 |
| 3,376,032 | 4/1968 | Schmid | 267/218 |
| 3,399,905 | 9/1968 | Volgel | 267/218 |
| 3,610,656 | 10/1971 | Klees | 267/218 |
| 4,183,509 | 1/1980 | Nishikawa | 267/218 |
| 4,743,000 | 5/1988 | Karnopp | 267/218 |

FOREIGN PATENT DOCUMENTS

| | | |
|---|---|---|
| 0202941 | 5/1986 | European Pat. Off. . |
| 686322 | 2/1967 | France . |
| 1242946 | 6/1967 | Germany . |
| 2827513 | 9/1981 | Germany . |
| 3413815 | 3/1987 | Germany . |
| 4007261 | 9/1991 | Germany . |
| 778281 | 1/1953 | United Kingdom . |
| 2159234 | 11/1985 | United Kingdom . |

*Primary Examiner*—Robert J. Oberleitner
*Assistant Examiner*—Clifford T. Bartz
*Attorney, Agent, or Firm*—Knobbe, Martens, Olson & Bear

[57] ABSTRACT

An adjustable shock absorber is provided having means for adjusting the damping curves and breakover characteristics of the shock absorber while the shock absorber is installed in a vehicle. The shock absorber has a generally elongated cylindrical body defined by concentrically mounted inner and outer cylinders. A pair of end caps mounted on the ends of the inner and outer cylinders retain a working medium therein. Disposed within the elongated inner cylinder is a movable piston defining upper and lower chambers. Working medium is transportable between the upper and lower chambers via an annular passage formed between the inner and outer cylinders. A plurality of adjustable valves are disposed in the path of transportation of the working medium for providing an adjustable damping function.

19 Claims, 4 Drawing Sheets

ADJUSTABLE SHOCK ABSORBER

BACKGROUND OF THE INVENTION

1. Field of the Invention

This invention relates generally to an adjustable shock absorber for motorized vehicles and, more particularly, to a shock absorber having a plurality of adjustable valves disposed in the flow path of a damping fluid or other working medium according to which adjustments may be made to the damping curves and break over characteristics of the shock absorber while the shock absorber is installed in a vehicle.

2. Description of the Prior Art

It is known in the art of vehicle suspension design that shock absorbers may be placed between relatively movable portions of a vehicle suspension, such as between the frame of the vehicle and the struts supporting each wheel, in order to reduce the forces transmitted from the wheels to the automotive frame and to damp out unwanted oscillations caused by the vehicle mass acting against a suspension spring or other resilient member disposed in the vehicle suspension.

Typically, such shock absorbers are comprised of a piston and cylinder arrangement in which a damping fluid or other working medium is caused to pass through a defined aperture or orifice. The flow of working medium through the orifice produces a characteristic damping curve according to known principles of fluid dynamics. For an incompressible viscous fluid, for instance, the Bernoulli equation predicts that the damping force will be proportional to the square of the flow velocity through the orifice. See, eg., Robert W. Fox, Alan T. McDonald, *Introduction to Fluid Dynamics*, 3rd Ed. 1985, pp 391–395.

It is also known to vary the damping characteristics of a shock absorber, as desired, in order to accommodate for changes in the mass of the vehicle and its load, stiffness of the suspension springs, and the particular characteristics of the shock forces imparted on the wheels as the vehicle travels over a road or off-road surface. For high frequency shock forces, for instance, corresponding to high speed travel over a bumpy road, it may be desirable to decrease the damping function of the shock absorber in order to reduce the damping forces exerted on the vehicle frame. In other driving conditions it may be desirable to increase the damping function of the shock absorber in order to reduce the peak overshoot for low frequency inputs and to provide a faster settling time.

For competition motorcycle suspensions, it is particularly important that the shock absorbers be "tuned" to the type of terrain over which the motorcycle will travel. Unlike conventional automotive suspensions, which are designed mainly for use on paved roads, motorcycle suspensions must accommodate a variety of terrain types present in off-road travel conditions. Similarly, in high-speed automotive racing it is advantageous to be able to "tune" the suspension system to the particular track on which the car will be traveling. A tighter or looser suspension may be desired, depending upon the particular type of pavement surface, shape of the track, and presence of imperfections or debris on the road surface. In each instance, it is desirable to adjust the shock absorber to provide optimal performance for the particular road or terrain conditions present.

One way to accomplish this adjustment function is to provide a shock absorber with removable inserts defining discrete orifices corresponding to known damping curves. By changing the size of the orifice, one can vary the damping characteristics of the shock absorber in a predictable manner. A drawback of this type of design, however, is that the shock absorber must be removed from the vehicle and disassembled in order to make each adjustment. This can be a time consuming process, for instance, in cases where trial-and-error adjustments are necessary to fine tune the suspension system of a vehicle before a race. Also, only discrete adjustments may be made. It is not possible, for instance, to provide a continuous range of adjustments due to the finite number of interchangeable inserts that can be made available.

To overcome these drawbacks, it is known to provide a shock absorber with one or more variable orifice valves for adjusting the damping function of the shock absorber. One such system is described in U.S. Pat. No. 2,780,321, issued to C. Sturari of Milan, Italy. That patent discloses a conventional fluid-damped shock absorber having adjustment means disposed at one or both ends adapted to vary the size of metering ports through which a damping fluid passes under the influence of a piston moving within a cylinder. At one end, the adjustment means consists of a plurality of balls seated in a narrow bore leading to the piston rod axial bore. On one side, the balls engage the end of a threaded screw fitted in the shock absorber casing. On the other side, the balls engage the end of a rod fitted in the piston rod axial bore. As the screw is adjusted the balls cause the rod to move axially, allowing for the adjustment of a needle valve or other variable orifice valve disposed within the fluid-contacting surface of the piston. Other adjustable shock absorbers are known which incorporate an electric solenoid for operating a variable orifice disposed within the piston.

The placement of variable orifice valves in a movable piston requires the implementation of fairly sophisticated control elements, such as balls, linkages, extension rods and electric solenoids, for adjusting the variable valve. This control arrangement has certain undesirable characteristics from a manufacturing standpoint as it necessitates providing many additional components for transmitting the adjustment forces to the centrally disposed valve. This increases the expense of manufacturing the adjustable shock absorber.

Furthermore, due to the added complexity of the adjustment mechanisms and the space occupied thereby, it is often necessary to reduce the piston diameter of the shock absorber in order to accommodate the additional components in a single cohesive unit. This creates additional undesirable characteristics in that the shock absorber is then required to operate at relatively high pressures; e.g., pressure levels in excess of 725 $lb/in^2$. Under these high-pressure conditions, the forces exerted on the working medium cause it to behave like a spring, producing undesirable hysteresis effects on the damping curve that are not easily predicted or controlled.

Adjustable shock absorbers present the additional design problem in that they have a much wider range of operation than conventional shock absorbers. Where it is desirable to operate a shock absorber with a particularly high damping function, for instance, very high pressures may be generated in the shock absorber in the event that a high velocity displacement is encountered. These high pressures could cause the shock absorber to rupture or impart dangerously high forces on other components comprising the vehicle suspension system.

SUMMARY OF THE INVENTION

One object of the present invention is to provide an adjustable shock absorber that is easily adjustable while installed in a vehicle. Accordingly, the present invention provides an adjustable shock absorber having an elongated inner cylinder and an elongated outer cylinder defining an annular passage. A pair of end caps are provided on the ends of the inner and outer cylinders for containing a damping fluid or other working medium therein. A piston is slidably retained within the elongated inner cylinder, dividing the cylinder into upper and lower chambers between which the working medium is transportable. Disposed in the path of transportation of the working medium is a plurality of adjustable valves for adjusting of the damping curves and breakover characteristics of the shock absorber. Each valve is adjustable via mechanisms accessible from the outside of the shock absorber while it is installed in a vehicle.

An optional feature of the present invention is that it provides an adjustable shock absorber that operates at relatively low pressures. Accordingly, the annular passage described above is preferably adapted to support substantially unrestricted bi-directional flow in order to minimize the required flow-area of the annular passage and to maximize heat transfer to the outer cylinder wall. For a compact shock absorber this small annular passage allows for the use of a relatively large piston, having a piston diameter of about 30–60 mm, thereby advantageously reducing the operating pressure in the shock absorber.

Another optional feature of the present invention is that it provides an adjustable shock absorber that is easy and inexpensive to manufacture. Accordingly, an adjustable shock absorber is provided having a valve assembly body and a partition element that are adapted to be assembled together and threadingly attached to one end of the shock absorber body. The plurality of adjustable valves for adjusting of the damping characteristic of the shock absorber are similarly adapted to be assembled into the valve assembly body such that the entire assembly may be advantageously installed or removed as a single unit.

Another optional feature of the present invention is that it provides an adjustable shock absorber having a "breakover" characteristic for limiting the maximum pressure generated within the shock absorber at high velocity displacements. Accordingly, an adjustable shock absorber is provided having a pressure-activated relief valve. The relief valve preferably has an adjustably variable preloaded seating force determined by the axial compression of a spring or other resilient member disposed within the valve body. The valve body is slidingly retained within a cylindrical cavity defining a valve seat. The breakover characteristic of the shock absorber, defining the threshold force or pressure at which the relief valve becomes conductive, may be determined by adjusting a manually rotatable knob adapted to increase or decrease the spring force acting on the valve body.

Further objects and features of the present invention will become apparent to those skilled in the art from the following detailed description of the preferred embodiments having reference to the figures.

DETAILED DESCRIPTION OF THE PREFERRED EMBODIMENTS OF THE INVENTION

Figure 1:
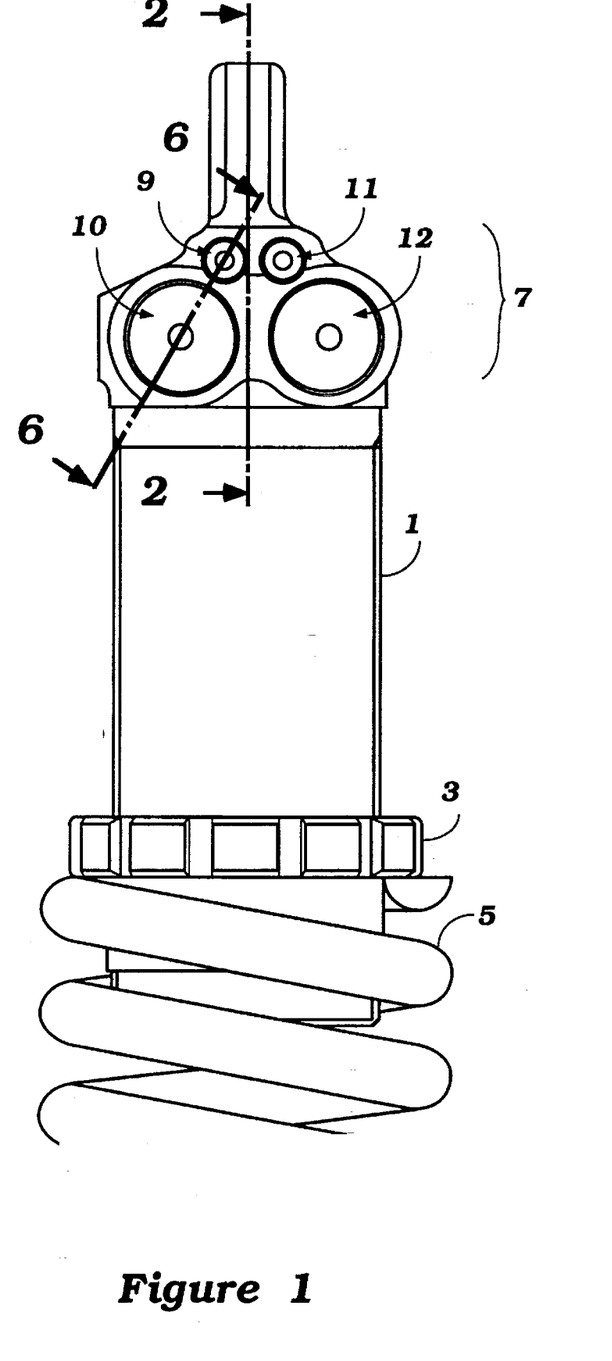
FIG. 1 is an elevational side view of an adjustable shock absorber having features of the present invention.

FIG. 1 is a side elevational view of an adjustable shock absorber having features of the present invention. As can be seen, the shock absorber generally comprises an elongated cylindrical body 1 to which a flange 3 has been fitted at one end for retaining a suspension spring 5. At the other end of the shock absorber body is disposed a valve assembly body 7 adapted to retain a plurality of adjustable valves 9–12 for adjusting the damping characteristics of the shock absorber, as will be described herein.

Figure 2:
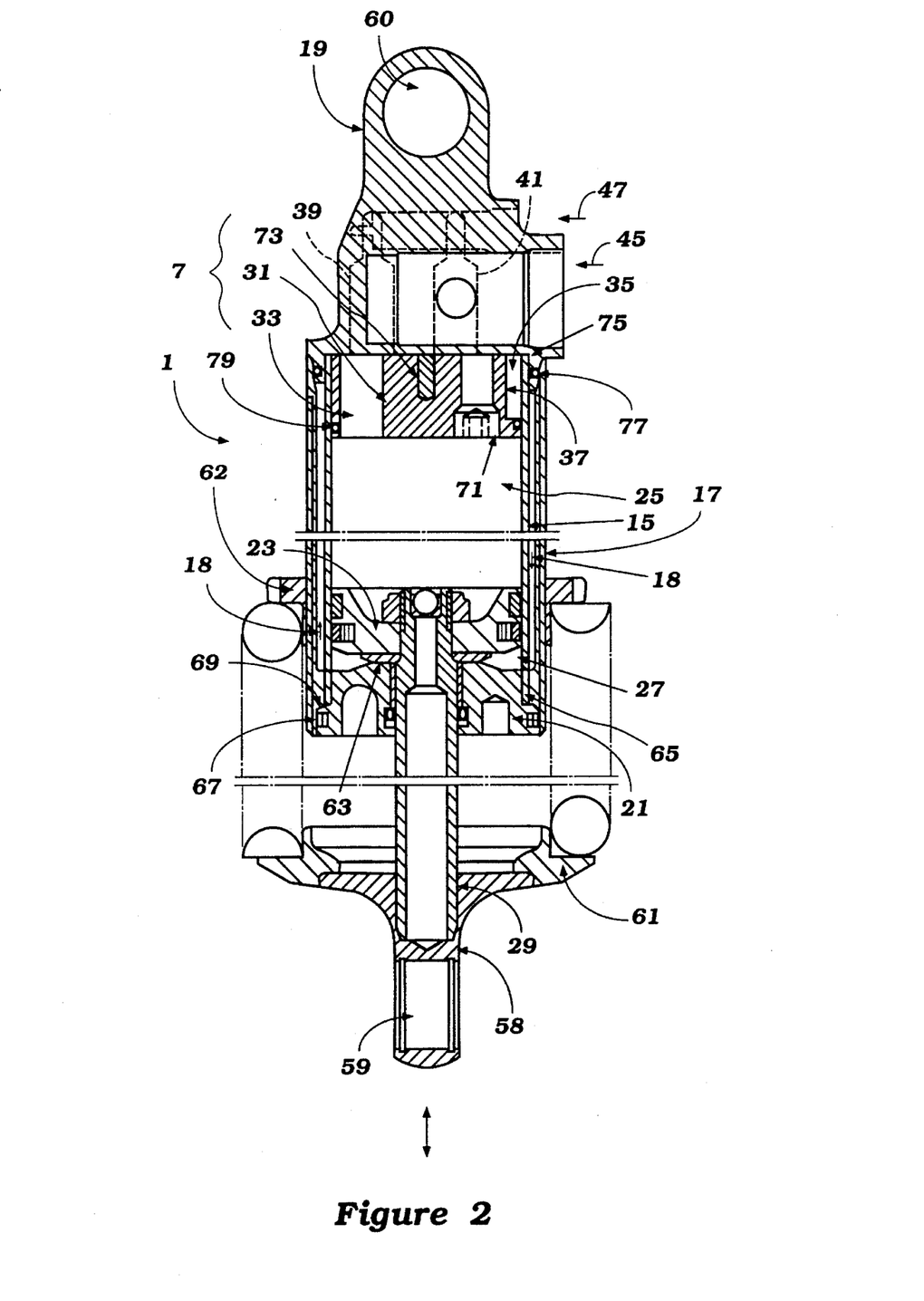
FIG. 2 is a cross-sectional view of the adjustable shock absorber of FIG. 1, taken along the B—B viewing plane.

FIG. 2 is a cross-sectional view of the adjustable shock absorber of FIG. 1, taken along the partially dislocated B-B viewing plane, illustrating in more detail the particular preferred construction of an adjustable shock absorber in accordance with the present invention. For convenience, operation of the shock absorber will be described with reference to both FIG. 2 and the schematic diagram indicated in FIG. 3 wherein like elements will be designated with the same reference numeral.

From FIG. 2 it may be observed that the shock absorber body 1 is further comprised of an elongated inner cylinder 15 and an elongated outer cylinder 17 mounted concentrically with respect to one another and defining an annular passage 18. End caps 19 and 21 are provided on the upper and lower ends, respectively, of the inner and outer cylinders 15 and 17 in order to contain a working medium therein. A piston 23 is sealingly engaged with and axially movable within the inner cylinder 15, according to known principles of mechanical design, defining upper and lower chambers 25 and 27, respectively. A piston rod 29 is slidingly retained within a sealed opening provided in a the lower end cap 21 in order to communicate displacement of the vehicle suspension to the piston 23.

It will be understood from FIG. 3 that as the piston 23 moves up and down in the cylinder 19, work is performed on the working medium disposed therein as it is displaced between the upper and lower chambers 25 and 27 through various passages and valves, which will be described in greater detail below. In this manner, a damping function is achieved as energy is transferred from the vehicle suspension system to the working medium disposed within the shock absorber. This working medium is preferably a liquid, such as hydraulic oil. Alternatively, it may consist of a gas, such as air, or any other type of viscous damping fluid known in the art.

Having reference again to FIG. 2, it may be seen that a partition element 31 is interposed in the path of transportation of working medium between the upper chamber 25 and the annular passage 18, defining further passages 33 and 35 separated by an interior wall portion 37. The passages 33 and 35 are adapted to conduct working medium to and from corresponding passages 39 and 41 formed in the upper end cap 19. The end cap 19 includes a valve assembly body 7 having formed therein a plurality of recessed openings, such as openings 45 and 47, for receiving the corresponding plurality of adjustable valves 9–12 indicated in FIGS. 1 and 3. It will be appreciated that the various passages provided in the partition element 31 and in the valve assembly body 7 allow selected valves to be interposed in the path of transportation of working medium between the upper and lower chambers 25 and 27, enabling independent adjustment of the damping and breakover characteristics of the shock absorber in jounce (compression) and rebound (tension).

Figure 3:
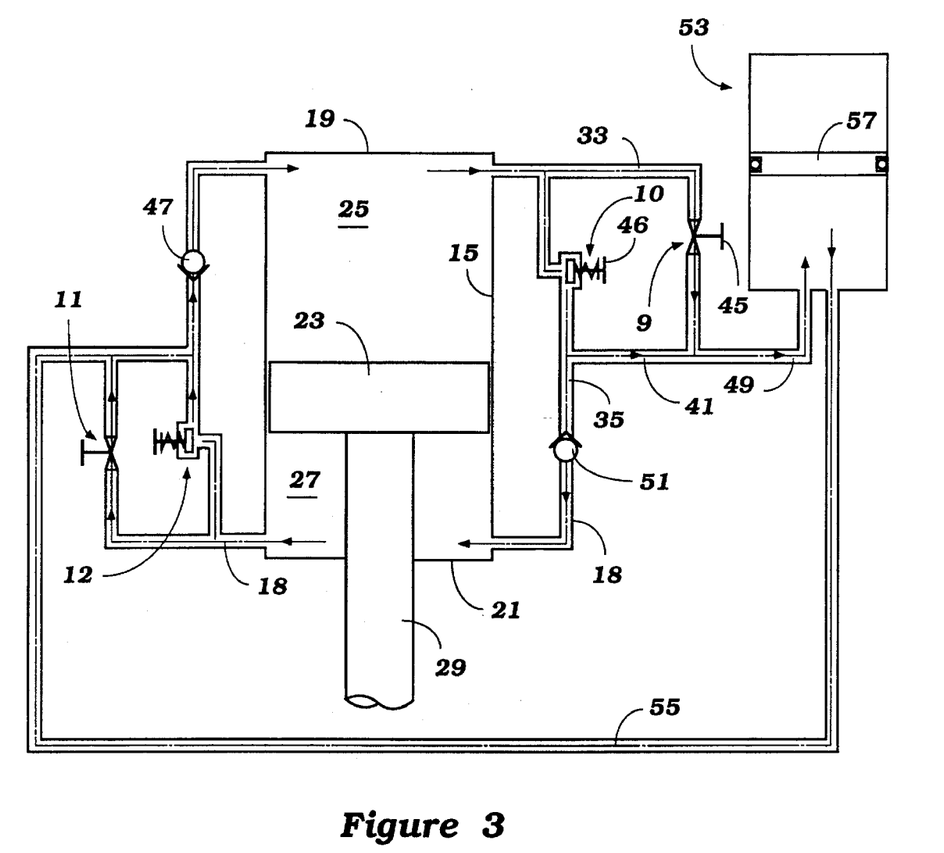
FIG. 3 is a schematic diagram of an adjustable shock absorber having features of the present invention.

In the jounce stroke the piston 23 is displaced upward toward the end cap 19, as indicated schematically in FIG. 3, causing pressure to be exerted on the working medium disposed in the upper chamber 25. Working medium is displaced into the adjoining passage 33 wherein it is provided to the valves 9 and 10 connected in parallel. The valve 9 is preferably a throttle-type valve having a variable orifice area determined by the adjustment of an adjustment mechanism 45. The valve 10 is a pressure activated relief valve of the type having an adjustably variable breakover point determined by the adjustment of an adjustment mechanism 46. The valves 11 and 12 remain inactive during this time due to the blocking effects of the check valve 47.

If the pressure exerted on the working medium by the piston 23 is less than the breakover pressure of the relief valve 10, then the relief valve 10 is non-conductive. In that condition substantially all of the flow passes through the throttle valve 9, producing the characteristic damping curves x–z shown in FIG. 4. This corresponds to relatively low-velocity displacements of the piston 23. For higher-velocity piston displacements, the pressure exerted on the working medium increases as greater resistance is encountered by the working medium flowing through the throttle valve 9. When the pressure reaches a predetermined breakover point, the relief valve 10 becomes conductive and fluid flow is divided between the two valves, producing the characteristic breakover curves t–v shown in FIG. 4.

After passing through one or both of the valves 9 and 10, the working medium enters into the flow passage 41 wherein it is divided between connecting passages 35 and 49. Most of the working medium is returned to the lower chamber 27 through the passage 18 and the check valve 51. Working medium displaced by the piston rod 29 is delivered via the passage 49 to an accumulator 53 wherein it resides until the piston rod 29 is retracted upon the rebound stroke of the piston 23.

Rebound operation of the shock absorber is substantially the same as described above, except that working medium is transported from the lower chamber 27, through one or both of the adjustable valves 11 and 12, and returned to the upper chamber 25 through the check valve 47. The valves 9 and 10 remain inactive during the rebound stroke of the piston 23 due to the blocking effects of the check valve 51. As the piston rod 29 is retracted from the lower chamber 27, working medium from the accumulator 53 is replaced to the upper chamber 25 via a return passage 55.

Figure 4:
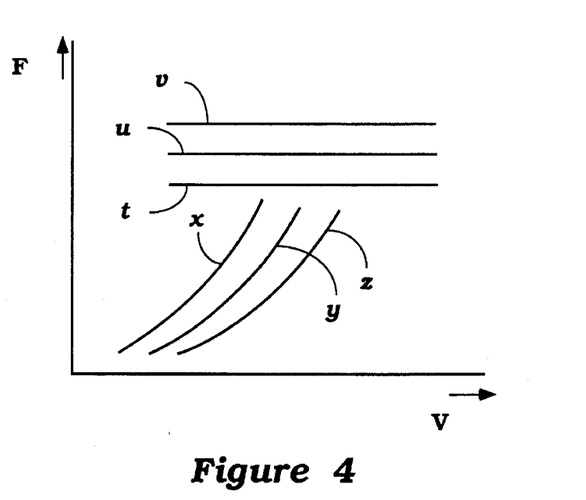
FIG. 4 is a graph of damping force (F) vs. piston displacement velocity (V) illustrating possible damping curves and breakover characteristics obtainable with an adjustable shock absorber constructed in accordance with the present invention.

Preferably, the relief valves 10 and 12 have relatively large flow capacities in comparison to the throttle valves 9 and 11 so that the pressure drop across each relief valve and, therefore, the damping force exerted on the piston 23, remains relatively constant over a predetermined range of flow rates, as indicated by the curves t–v in FIG. 4. The accumulator 53 is preferably of a pressurized gas type that has a floating piston 57, as indicated, and is mounted externally to the shock absorber depicted in FIG. 2. Alternatively, other arrangements may be used, as desired, without departing from the scope of the invention as herein disclosed. In this manner, it will be appreciated that damping and breakover characteristics of the shock absorber in jounce and rebound may be adjusted independently by adjusting corresponding valves 9 and 10 or 11 and 12, respectively.

Figure 5:
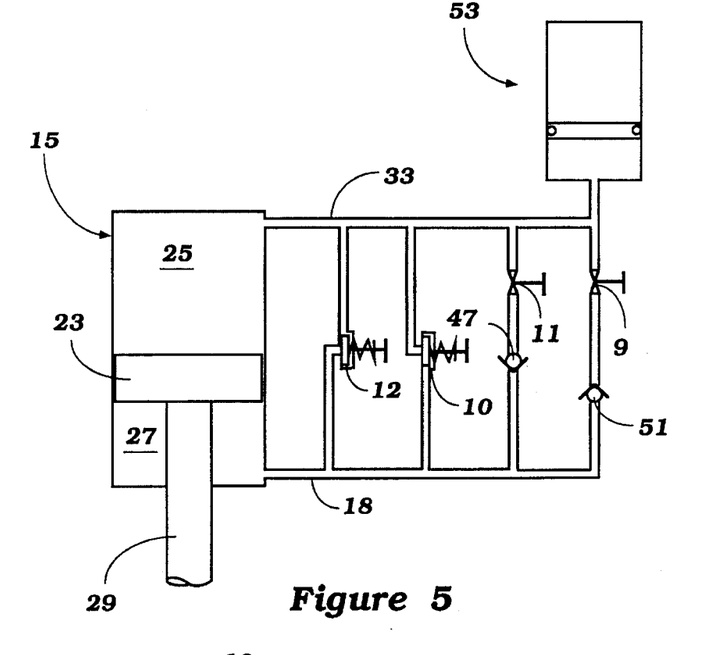
FIG. 5 is a simplified schematic diagram of an adjustable shock absorber having features of the present invention.

FIG. 5 is a schematic diagram showing an alternative simplified embodiment of an adjustable shock absorber having features of the present invention. It may be seen that some of the passages indicated in FIG. 3 have been combined advantageously to produce the simplified design shown. Similarly, it will be appreciated that the relief valves 10 and 12 are also inherently check valves. Therefore, the check valves 47 and 51 are only required to be placed in series with the corresponding throttle valves 11 and 9.

Operation of the simplified circuit may be generally understood as follows. As the piston 23 is displaced upwardly within the cylinder 15, working medium is displaced from the upper chamber 25 into the passage 33 wherein it is provided to the relief valves 10 and 12 and the throttle valves 9 and 11 in parallel. Most of the working medium passes through one or more of the valves 9–12, as will be described in more detail below, and is returned to the lower chamber 27 via the return passage 18. Working medium displaced by the piston rod 29 is diverted to the accumulator 53, which operates substantially as described above in connection with FIG. 3.

For low-pressure jounce operation, the relief valve 10 is non-conductive and substantially all of the working medium flows through the check valve 51 in series with the throttle valve 9, producing the characteristic damping curves x–z in FIG. 4. It will be appreciated that during this time the check valve 47 operates to block the flow of working medium through the throttle valve 11, while the relief valve 12 acts inherently as a check valve to fluid flow in this direction. For high-pressure operation, the relief valve 10 becomes conductive at a predetermined breakover point and fluid flow is divided between the relief valve 10 and the throttle valve 9 as the working medium is transported from the upper chamber 25 to the lower chamber 27. Operation of the circuit is substantially the same for piston displacements in the opposite direction, except that working medium is directed from the lower chamber 27 through the passage 18 and one or both of the valves 11 and 12, and is returned to the upper chamber 25 via the passage 33.

Having described the basic construction and operation of an adjustable shock absorber having features of the present invention, the remaining discussion will be directed toward the particular preferred embodiments presently envisioned by the inventor for carrying out his invention. Referring once again to FIG. 2, it may be seen that one end of the piston rod 29 is attached to the piston 23 using conventional mechanical attachment methods, such as a press-ball fit. The opposite end is preferably slightly larger in diameter, having a preferred outer diameter of about 10–18 mm, and is attached to a mounting element 58 by threaded engagement therewith or by other means well known in the art. The piston rod 29 is preferably made of a high-strength material and is hollow along a substantial portion of its length, as indicated, in order to minimize its mass. Alternatively, a solid rod may be used without departing from the scope of the invention as herein disclosed.

The mounting element 58 preferably has an aperture 59 formed at one end for receiving a strut member or other support disposed in a vehicle suspension system. A corresponding aperture 60 is formed in the end cap 19. In this manner, the shock absorber may be mounted between relatively movable portions of a vehicle suspension system in order to reduce the forces transmitted from the wheels to the automotive frame and to damp out unwanted oscillations caused by the vehicle mass acting against the suspension spring 5.

The suspension spring 5 is preferably provided between a flange element 61 provided in the mounting element 58 and a corresponding flange element 62 provided on the outer cylinder 17 of the shock absorber body, as shown. The stiffness of the suspension spring 5 may be selected to provide desired response characteristics, depending upon the combined mass of the vehicle and its load and the damping characteristics of the shock absorber. In the position shown, the spring 5 is in its fully extended position with the piston 23 and the piston rod 29 at their respective ends of travel. It will be understood that as the shock absorber is loaded, the weight of the vehicle imparts a compression force on the shock absorber and the suspension spring 5 such that the suspension spring 5 compresses, forcing the piston 23 upwardly.

The flange element 61 is retained in place by the force of the suspension spring 5 acting upon it. The flange element 62 may be fixed to the outer cylinder 17 by conventional attachment methods, such as spot welding or mechanical fasteners. An optional return stop 63 may be provided between the lower surface of the piston 23 and the upper surface of the end cap 21 in order to insulate the two elements from possible mechanical shock as the spring 5 draws the piston 23 to its end of travel. Preferably, the return stop 63 is made of a resilient material, such as rubber, selected to be substantially impervious to the effects of the particular working medium disposed within the shock absorber body.

To accommodate easy assembly, the lower end cap 21 preferably threadingly engages the inner wall portion of the inner cylinder 15 via threads 65 and is sealed against the inner wall of the outer cylinder 17 by means of a seal 67 and a stop surface 69. The upper end cap 19 is adapted to be fastened to the partition element 31 via a conventional fastener, such as a hex-key bolt fastener 71, as indicated. A pin 73 serves as an alignment device for assembling the partition element 31 with the end cap 19. The entire assembly is preferably adapted to be assembled onto the outer wall portion of the inner cylinder 15 via threads 75. The upper end cap 19 and the partition element 31 are preferably sealed to the inner wall portion of the outer cylinder 17 and the inner wall portion of the inner cylinder 15, respectively, via corresponding seals 77 and 79 in order to avoid leakage of the working medium.

Preferably, the annular passage 18 is adapted to support unrestricted bi-directional flow of the working medium in order to minimize resistance to fluids passing therethrough and to maximize convection and conduction of heat from the working medium to the outer wall surface of the outer cylinder 17. Alternatively, the passage 18 may be subdivided or partitioned into smaller passages, as desired, without departing from the scope of the invention as herein disclosed. The annular passage 18 is also preferably relatively small in cross section so that in a compact shock absorber the inner cylinder 15 can accommodate a relatively large piston, eg. about 30–60 mm in diameter, in order to reduce the operating pressure of the shock absorber for a given load.

Figure 6:
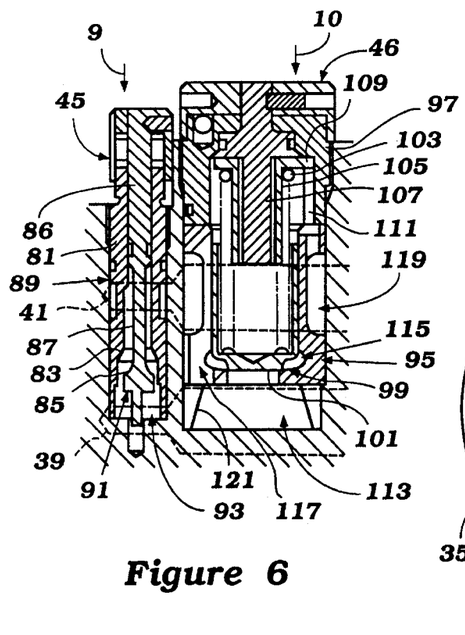
FIG. 6 is a cross sectional view of the adjustable shock absorber of FIG. 1, taken along the A—A viewing plane.

FIG. 6 is a cross-sectional view of the valve assembly body 7 of FIG. 1 taken along the A—A viewing plane, illustrating the preferred construction of the adjustable valves 9 and 10. The smaller valve 9 is preferably a throttle-type variable orifice valve, as shown. The valve 9 includes a cylindrical valve housing 81 sealingly engaged within a corresponding opening formed in the valve assembly body. The valve housing 81 has formed therein a valve seat 83 adapted to receive a corresponding valve body 85 disposed in a passage therethrough.

The valve body 85 includes an elongated stem portion 86, which is threadingly and sealingly engaged with the inner surface of the valve housing 81, as shown. A central portion 87 of the valve stem 86 is narrower in diameter than the corresponding portion of the valve housing 81, as indicated, in order to allow for transportation of working medium through an opening 89 formed therein. The outermost end of the valve stem 86 extends beyond the valve housing 81 and is mechanically engaged with a manually rotatable adjustment knob 45. In this manner, it will be appreciated that a variable orifice 91 is produced between the valve body 85 and the valve seat 83 that can be adjusted, as desired, by rotational movement of the knob 45.

In operation, working medium enters the chamber 93 via a passage 39 (shown in dashed) and is forced under pressure through the variable orifice 91. The resistance of the throttle valve 9 to the flow of working medium therethrough is determined by the size of the variable orifice 91 formed therein. Larger orifices correspond to smaller flow resistance and smaller orifices correspond to larger flow resistance. Once the working medium passes through the variable orifice 91, it continues through the valve housing 81, through the opening 89 formed therein, and is returned to the shock absorber through the return passage 41 (shown in dashed).

The larger valve 10 is preferably a pressure activated relief valve, as described herein, having adjustable breakover characteristics. An inner valve housing 95 and an outer valve housing 97 are provided and are sealingly retained within a corresponding recessed opening formed in the valve assembly body, as shown. The inner valve housing 95 includes a valve seat portion 99, against which a spring-loaded valve body 101 is seated. The valve body 101 is open at one end and retains a spring 103 which acts between the valve body 101 and a collar 105 disposed in the outer valve housing 97. The collar 105 threadingly engages a rotatable shaft 107, which is sealed to the inner wall of the outer valve housing 97.

A manually rotatable knob 46 engages the shaft 107 so that the collar 105 may be adjustably threaded along the shaft 107, thereby compressing the spring 103. The collar 105 preferably includes a keyed portion 109 or other means for engaging a recessed slot 111 formed in the outer valve housing 97 for preventing the collar 105 from rotating as it threadingly engages the shaft 107. In this manner, the force exerted on the valve body 101 may be adjusted, as desired, to provide predetermined breakover characteristics as indicated by the curves t–v in FIG. 4.

In operation, working medium enters the cavity 113 through the passage 39 (shown in dashed). At low pressures the valve body 101 seals tightly against the valve seat 99 so that substantially no fluid passes. As the pressure increases, however, the pressure force exerted by the working medium on the valve body 101 begins to approach the opposing force imparted on the valve body 101 by the compression spring 103. At a predetermined breakover point, the valve body 101 lifts from its corresponding seat 99 and working medium is allowed to pass into the annular chamber 115. From there it is passed back through a passage 117 formed in the inner valve housing 95, through the return passage 41 (shown in dashed) and a corresponding annular passage 119, wherein it is returned to the shock absorber. The relief valve 10 preferably remains conductive so long as the pressure force exerted on the valve body 101 exceeds the opposing force imparted on the valve body by the spring 103. An optional spring-loaded check valve 121 may be provided, as desired, to regulate the flow of working medium through the relief valve. In this manner, the valves 9 and 10 may be adjusted via the corresponding adjustment mechanisms 45 and 46 to control the damping and breakover characteristics of the adjustable shock absorber during its jounce or compression stroke. Similarly constructed valves and adjustment mechanisms may be used to control the damping and breakover characteristics of the shock absorber during its rebound or tension stroke.

Figure 7:
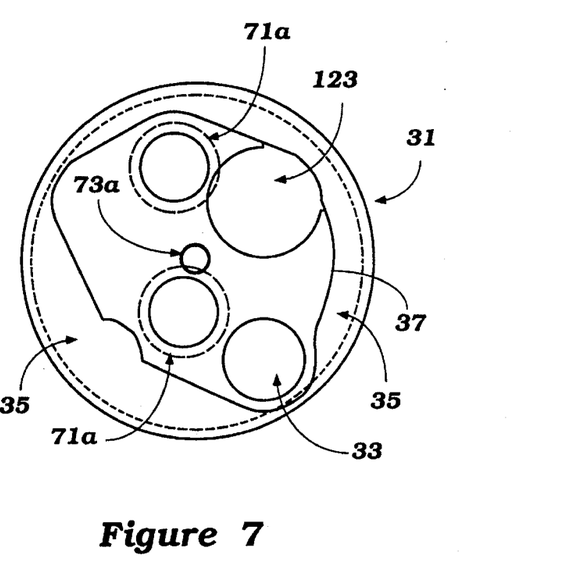
FIG. 7 is a top view of the partition element of FIG. 2.

FIG. 7 is a top view of the partition element 31 of FIG. 2, showing its preferred construction. The flow passage 35 indicated in FIG. 2 can be seen in FIG. 7 as comprising a roughly annular region 35 surrounding the interior wall portion 37. The interior passage 33 shown in FIG. 2 may also be seen in FIG. 7 as a cylindrical hole 33 extending through the partition element 31.

As discussed above, the partition element 31 is adapted to be assembled with the corresponding end cap 19 indicated in FIG. 2. This may be accomplished by the insertion of conventional fasteners through counter sunk holes 71a formed in the partition element. A centrally disposed bore cavity 73a is adapted to receive the mating pin 73 indicated in FIG. 2 for centering the partition element 31 during assembly. Once assembled, it will be appreciated that the passages 33 and 35 are placed in fluid communication with the corresponding passages 39 and 41 indicated in FIG. 2.

Preferably, the partition element 31 has formed therein a chamber 123 for housing one or more of the check valves 47 or 51 indicated in FIGS. 3 and 5. The chamber 123 is preferably open on one side to the passage 35, as shown, in order to check the flow of working medium to and from that passage. Alternatively, appropriate check valves may be disposed in any number of locations throughout the passages formed in the partition element 31 or the valve assembly body without departing from the scope of the invention as herein disclosed.

Since certain changes may be made in the above apparatus without departing from the scope of the invention herein involved, it is intended that all matter contained in the above description or shown in the accompanying drawings shall be interpreted in an illustrative, and not limiting, sense.

I claim:

1. An adjustable shock absorber comprising in combination, an elongated inner cylinder, first and second end caps disposed substantially on the ends of said elongated inner cylinder for containing a working medium therein, a piston slidably retained within said elongated inner cylinder defining upper and lower chambers within which said working medium is displaceable, an elongated outer cylinder substantially coextensive with said elongated inner cylinder, said inner and outer elongated cylinders defining a substantially annular passage through which said working medium is transportable between said upper and lower chambers, and a plurality of adjustable valves disposed in said first end cap in the path of transportation of said working medium, said valves being adapted to allow independent adjustment of the damping curves and breakover characteristics of said shock absorber in both jounce and rebound, said first end cap and said adjustable valves disposed therein forming a single integral unit and having corresponding adjustment mechanisms accessible from the outside of the shock absorber while said shock absorber is installed in a vehicle.

2. An adjustable shock absorber as recited in claim 1 wherein said annular passage is adapted to support substantially unrestricted bi-directional flow of said working medium therethrough.

3. An adjustable shock absorber as recited in claim 1 further comprising a piston rod slidingly retained within an opening formed in said second end cap and connected to said piston, said piston rod adapted to communicate displacement between relatively movable portions of a vehicle suspension system to said piston.

4. An adjustable shock absorber as recited in claim 1 wherein said first end cap comprises a valve assembly body having formed therein a plurality of recessed openings adapted to sealingly retain said plurality of adjustable valves, and a partition element adapted to selectively direct the transportation of said working medium through said plurality of adjustable valves.

5. An adjustable shock absorber as recited in claim 4 wherein said valve assembly body is adapted to threadingly engage one end of said elongated inner cylinder.

6. An adjustable shock absorber as recited in claim 5 wherein said valve assembly body is further adapted to sealingly engage the inner wall portion of said elongated outer cylinder and said partition element is further adapted to sealingly engage the inner wall portion of said elongated inner cylinder.

7. An adjustable shock absorber as recited in claim 4 wherein said valve assembly body has four recessed openings, two of which are adapted to receive adjustable valves for adjusting the damping curve and breakover characteristic of said shock absorber for jounce displacement and the other two of which are adapted to receive adjustable valves for adjusting the damping curve and breakover characteristic of said shock absorber for rebound displacement.

8. An adjustable shock absorber as recited in claim 7 wherein at least one of said adjustable valves comprises a throttle-type valve having an adjustably variable orifice area, and wherein at least one other of said adjustable valves comprises a pressure-activated relief valve having an adjustably variable preloaded seating force.

9. An adjustable shock absorber as recited in claim 3 further comprising a suspension spring adapted to act between said piston rod and said elongated outer cylinder.

10. An adjustable shock absorber as recited in claim 9 wherein said piston is substantially larger in diameter than said piston rod.

11. An adjustable shock absorber as recited in claim 10 wherein said piston is between about 30–60 mm in diameter and said piston rod is between about 10–18 mm in diameter.

12. An adjustable shock absorber as recited in claim 1 wherein at least four adjustable valves are disposed in the path of transportation of said working medium, at least two of which are adapted for adjusting the damping curve and breakover characteristic of said shock absorber for jounce displacement, and at least two others of which are adapted for adjusting the damping curve and breakover characteristic of said shock absorber for rebound displacement.

13. An adjustable shock absorber as recited in claim 12 wherein at least one of said adjustable valves comprises a throttle-type valve having an adjustably variable orifice area determined by the axial displacement of a valve body within a cylindrical cavity defining a valve seat, said cylindrical cavity having a threaded portion thereof adapted to engage a corresponding threaded portion of said valve body, and said adjustment mechanism comprises a manually rotatable knob adapted to engage said valve body for providing rotational and axial displacement thereof.

14. An adjustable shock absorber as recited in claim 12 wherein at least one of said adjustable valves comprises a pressure-activated relief valve having an adjustably variable preloaded seating force determined by the axial compression of a spring disposed within a substantially hollow valve body slidingly retained within a cylindrical cavity defining a valve seat, and said adjustment mechanism comprises a manually rotatable knob adapted to threadingly engage a corresponding collar acting against said spring for providing axial compression thereof.

15. A valve module for Use in an adjustable shock absorber of the type having a displaceable piston operable against a working medium contained within an elongated cylinder, said valve module comprising a valve assembly body having formed therein a plurality of recessed openings, a corresponding plurality of adjustable valves sealingly retained within said openings, said valves accessible from the outside of said valve module and adapted to provide independent adjustment of the damping and breakover characteristics in both jounce and rebound, and a partition element adapted to selectively direct the transportation of said working medium through said plurality of adjustable valves, whereby said valve module may be installed or removed as a single integral unit.

16. A valve module as recited in claim 15 wherein said valve assembly body has formed therein at least four recessed openings for receiving a corresponding number of adjustable valves at least two of which are adapted for independently adjusting the damping curve and breakover characteristic for jounce displacement, and at least two of which are adapted for independently adjusting the damping curve and breakover characteristic for rebound displacement.

17. A valve module as recited in claim 16 wherein at least one of said adjustable valves comprises a throttle-type valve having an adjustably variable orifice area determined by the axial displacement of a valve body within a cylindrical cavity defining a valve seat, said cylindrical cavity having a threaded portion thereof adapted to engage a corresponding threaded portion of said valve body, and said adjustment mechanism comprises a manually rotatable knob adapted to engage said valve body for providing rotational and axial displacement thereof.

18. A valve module as recited in claim 16 wherein at least one of said adjustable valves comprises a pressure-activated relief valve having an adjustably variable preloaded seating force determined by the axial compression of a spring disposed within a substantially hollow valve body slidingly retained within a cylindrical cavity defining a valve seat, and said adjustment mechanism comprises a manually rotatable knob adapted to threadingly engage a corresponding collar acting against said spring for providing axial compression thereof.

19. A valve module as recited in claim 15 further comprising a mounting element having an aperture formed therein for receiving a strut of a vehicle suspension.

* * * * *